(12) United States Patent
Lin

(10) Patent No.: US 6,851,011 B2
(45) Date of Patent: Feb. 1, 2005

(54) REORDERING HARDWARE FOR MASS STORAGE COMMAND QUEUE

(75) Inventor: Wen Lin, Longmont, CO (US)

(73) Assignee: STMicroelectronics, Inc., Carrollton, TX (US)

(*) Notice: Subject to any disclaimer, the term of this patent is extended or adjusted under 35 U.S.C. 154(b) by 234 days.

(21) Appl. No.: 09/927,010

(22) Filed: Aug. 9, 2001

(65) Prior Publication Data

US 2003/0033474 A1 Feb. 13, 2003

(51) Int. Cl.$^7$ .................. G06F 13/16; G06F 13/18
(52) U.S. Cl. .................. 711/4; 711/111; 711/154; 711/158; 710/5; 710/39; 710/40; 710/244; 369/53.27
(58) Field of Search ............... 711/4, 111, 154, 711/158; 710/40, 52, 5, 39, 310, 244; 369/53.27

(56) References Cited

U.S. PATENT DOCUMENTS

| | | | |
|---|---|---|---|
| 4,583,166 A | | 4/1986 | Hartung et al. |
| 5,140,683 A | | 8/1992 | Gallo et al. |
| 5,313,585 A | | 5/1994 | Jeffries et al. |
| 5,548,795 A | | 8/1996 | Au |
| 5,603,063 A | * | 2/1997 | Au .............................. 710/52 |
| 5,664,143 A | | 9/1997 | Olbrich |
| 5,854,941 A | | 12/1998 | Ballard et al. |
| 5,890,208 A | | 3/1999 | Kwon |
| 6,098,107 A | * | 8/2000 | Narvaez-Guarnieri et al. ... 709/239 |
| 6,112,265 A | * | 8/2000 | Harriman et al. ............. 710/40 |
| 6,301,639 B1 | * | 10/2001 | Cleavinger et al. ......... 711/112 |
| 6,418,510 B1 | * | 7/2002 | Lamberts ..................... 711/113 |
| 6,490,635 B1 | * | 12/2002 | Holmes ......................... 710/3 |
| 6,601,151 B1 | * | 7/2003 | Harris ........................ 711/158 |
| 2001/0008007 A1 | * | 7/2001 | Halligan et al. ............ 711/114 |
| 2001/0028524 A1 | * | 10/2001 | Hoskins ....................... 360/55 |
| 2002/0002655 A1 | * | 1/2002 | Hoskins ...................... 711/112 |
| 2002/0091882 A1 | * | 7/2002 | Espeseth et al. ............... 710/6 |
| 2003/0004948 A1 | * | 1/2003 | Bohrer et al. ................ 707/10 |
| 2003/0023778 A1 | * | 1/2003 | Berning et al. ................ 710/5 |

* cited by examiner

*Primary Examiner*—Mano Padmanabhan
*Assistant Examiner*—Jasmine Song
(74) *Attorney, Agent, or Firm*—Lisa K. Jorgenson; William J. Kubida

(57) ABSTRACT

A hardware command queue for mass storage systems having a memory device. A plurality of entries are defined in the memory device, at least some of which are active entries. At least some of the active entries correspond to pending access commands and at least one entry is a head entry corresponding to an in-flight access command. A physical target location is stored in each active entry and a computed servo distance value is stored in each active entry. A link list including pointers defining an execution sequence is stored with the command queue.

20 Claims, 5 Drawing Sheets

| CYLINDER | | HEAD | | BEGINNING SERVO SECTOR | END SERVO SECTOR | SERVO DISTANCE | NEXT COMMAND POINTER | PREVIOUS COMMAND POINTER | FLAGS |
|---|---|---|---|---|---|---|---|---|---|
| BEG | END | BEG | END | | | | | | |

REORDERING HARDWARE FOR MASS STORAGE COMMAND QUEUE

BACKGROUND OF THE INVENTION

1. Field of the Invention

The present invention relates, in general, to mass storage systems, and, more particularly, to systems and methods for hardware reordering of disk access commands in a disk drive command queue.

2. Relevant Background.

Mass storage devices such as disk drives, compact disk read only memory (CDROM), tape drives and the like are common computer system components used to store and provide access to large volumes of data and program code. Generally, mass storage devices are complex electromechanical systems that read and write data using electromagnetic and/or optical signals at precise locations on a media surface. In operation, a host processor system generates requests for access to particular stored data, and the mass storage device and associated controllers generate signals to the motors and read/write head electronics that access the information at the precise locations dictated by the commands.

In general, the host computer can generate access request commands at a much higher rate than the mass storage system can record. Also, the access requests may correspond to discontinuous locations of the physical media within the mass storage system. Significant delay occurs in locating the precise position that is subject of a particular access request. Hence, mass storage controllers have developed buffer mechanisms to perform rate adaptation, and more recently have developed to reorder requests so that the mass storage device efficiently moves the read/write head elements with respect to the media. This is particularly true in random access storage devices such as hard disk drives and CDROM drives where the controllers are designed to perform well with entirely random access requests.

Essentially, disk access commands generated by a host are placed in a command queue. Various methods are used to reorder the queued access commands and select a current command to launch. For example, one method selects the command with the shortest seek time so that the command in the queue with the shortest seek time with respect to the command currently being executed is selected as the next command to be launched. Another method selects commands in sequential cylinder order. Other known methods perform command queue reordering based on both seek time and rotational latency.

In each case, the algorithms used to reorder the command queue are implemented in software or firmware executing on a processor within the mass storage controller. This processor, however, is also responsible for generating command signals to the servo electronics and coordinating the read/write operations themselves. As areal density increases and data rates increase, the processor's resources are already taxed with these basic functions. Performing complex reordering algorithms at the same time is becoming increasingly difficult. As a result, firmware reordering algorithms stress simplicity, and may use sub-optimal reordering methods or limited size command queues to lessen the processor load. A need exists for systems and methods that improve command queue reordering processes while reducing the burden on processor resources.

SUMMARY OF THE INVENTION

Briefly stated, the present invention involves a hardware command queue for mass storage systems, and a mass storage system having a memory device. A plurality of entries are defined in a memory device, at least some of which are active entries. At least some of the active entries correspond to pending access commands and at least one entry is a head entry corresponding to an in-flight access command. A physical target location is stored in each active entry and a computed servo distance value is stored in each active entry. A link list including pointers defining an execution sequence is stored with the command queue.

In another aspect, the present invention involves a method for accessing a mass storage device by storing a plurality of mass storage access requests in a hardware command queue, where each mass storage access request is stored within and entry in the queue. An entry holding a currently active access request is designated as a head entry. A servo distance value is stored with the access request. A link list is stored in the command queue specifying an execution sequence for the commands stored in the hardware command queue.

BRIEF DESCRIPTION OF THE DRAWINGS

FIG. 2 illustrates in block-diagram form a hardware command queue suitable for use in the implementation of FIG. 1;

DETAILED DESCRIPTION OF THE PREFERRED EMBODIMENTS

The present invention involves mass storage systems that use hardware memory structures and hardware logic to manage and manipulate the order in which access commands are applied to a mass storage system. In contrast with conventional firmware command queue reordering systems, the systems and methods of the present invention off-load the complex tasks of command queue management to dedicated hardware that quickly and efficiently implement complex reordering algorithms while consuming little or none of the processor's resource. While the present invention is illustrated and described in terms of a hard disk drive control system, any mass storage system that is expected to respond to random access requests may benefit from the command ordering and reordering processes of the present invention. Such systems include read-only devices such as CDROMS, sequential access devices such as tape drives, as well as network storage devices. Moreover, the present invention is described in terms of magnetic disk storage devices, however, any storage technology including optical, magneto-optical, optical tape, and the like may be readily modified to take advantage of the teachings of the present invention.

Figure 1:
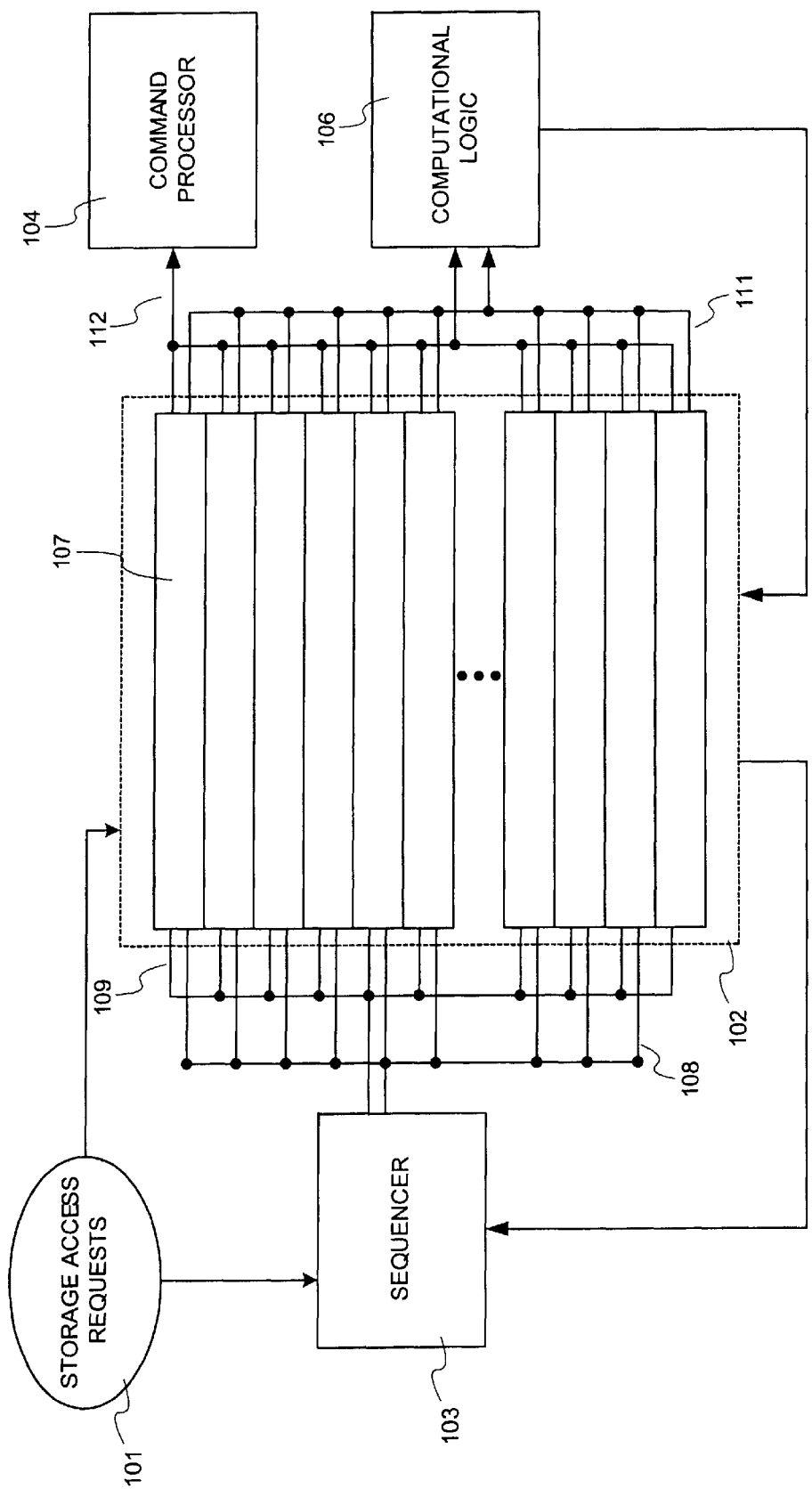
FIG. 1 shows a disk control system incorporating a hardware command queue in accordance with the present invention.

FIG. 1 shows a disk control system incorporating a hardware command queue in accordance with the present invention. Storage access requests comprise a command and associated data and parameters used to implement the command. A set of commands is defined by the mass storage system's controller, but typically conforms to a standard such as specified for an ATA or small computer systems interface (SCSI) bus specification. Typical commands include read, write, seek and the like.

In accordance with the present invention, storage access requests are placed or stored in a hardware command queue 102 upon receipt. Optionally, hardware command queue 102 may be active only when the command processor cannot process requests 101 at the rate they are being received. In cases where there are no waiting requests 101, requests 101 may be coupled directly to command processor 104 thereby bypassing the command queue 102. Command processor 104 represents the execution resources that generate the signals that control the read/write head electronics and positioning actuator(s) within a hard disk assembly (not shown) and may include a controller circuit, servo mechanism, read channel electronics and the like in one or more integrated circuits. For ease of understanding these elements are combined into a single functional unit identified as command processor 104.

Command queue 102 includes a plurality of entries 107, where each entry 107 corresponds to a particular pending or "in-flight" access request. Command queue 102 comprises a memory structure, such as a random access memory (RAM) array or content addressable memory (CAM) array that allows data to be written to and read from each line. A "line" or "entry" 107 within command queue 102 refers to a subset of the memory structure that can be individually addressed. A plurality of fields are defined within each entry 107 that hold various types of data related to a particular storage access request 101.

Sequencer 103 is aware of new storage access commands and functions to define an efficient execution sequence including all of the queued storage access requests. Hence, each time a new storage access requests enters command queue 102 or a storage access request is completed, sequencer 103 determines a new execution sequence (or verifies that the current execution sequence remains valid) involving the current set of access requests.

At any given time, one of the entries 107 is designated as a "head entry". The head entry 107 holds the storage access request 101 that is currently being processed (i.e., is "in-flight") by command processor 104. A head entry indicator may in practice be implemented by a flag in each entry 107 such that an entry with the flag set is the "head entry". In a particular implementation, another entry is designated as a "next-in-line" entry that under the currently applicable execution sequence will be launched upon completion of the head entry. The next-in-line entry may also be indicated by a control flag in each entry 107. The other entries 107 are either empty or hold a pending, but not yet launched or fetched storage access request 101.

In the implementation shown in FIG. 1, sequencer 103 includes a first output 108 that selects a first entry 107 and a second output 109 that selects a second entry 107. The selected entries are coupled to computational logic 106. Computational logic 106 computes a servo distance value indicating a distance or time required to access the second selected entry once the first selected entry is completed. The computed servo distance value is stored in a field of the hardware command queue entry 107.

In one embodiment, the servo distance value used is the difference between a given command and the next command in the current command execution sequence. In this case, each time a new command is entered into queue 102 the servo distance for the new command must be compared against each entry's servo distance. The new entry is inserted into the command sequence when its servo distance is less than that of the entry it is currently being compared to. In an alternative embodiment, the servo distance value is computed for each entry based upon the then-current head entry, and re-computed every time the head entry changes.

The execution sequence is then defined by placing the sorting the commands into increasing servo distance order. Sequencer 103 scans through all of the entries 107 either in order or preferably in order of the current execution sequence, computes, and stores a servo distance value for each entry.

Sequencer 103 subsequently determines and manages an execution sequence for the commands within queue 102. In a particular implementation command queue 102 includes a link list that specifies, for each entry, a request that is to be executed after that request, and a request that will be executed prior to that request. The link list is implemented by way of pointers stored in fields of each entry 107 in an exemplary implementation. Sequencer 103 updates pointer values based on the current servo distance values stored in each entry.

The entry having the smallest servo distance value is typically marked as the next request to be launched or fetched by command processor 104. In this manner, command processor 104 is given (or fetches) the request 101 that will incur the least delay to process. It may be desirable to augment the sequencing logic to include some fairness algorithm that will ensure that queued requests 101 will be handled out of order if they wait too long in the queue, but such optional features are readily implemented.

FIG. 2 illustrates in block-diagram form an exemplary hardware command queue 102 suitable for use in the implementation of FIG. 1. Although not shown in FIG. 2, each entry 107 will typically include a command operation code and data associated with the request (or a pointer to a separate data structure that holds this information) in addition to the data fields shown in FIG. 2. The size of queue 102 and the number of entries 107 can vary to meet the needs of a particular application, and can be made programmable so that a single hardware circuit implementation of the present invention may be used for a variety of applications.

As shown in FIG. 2, each entry includes fields to hold the physical location (i.e., cylinder, head and sector data) associated with the request 101. It is important that the physical location data is used in hardware command queue 102 as it is the physical location that will determine latency that occurs from one command to the next in a sequence of commands. A principle component of latency is the seek time associated with a read/write head moving across tracks from inner to outer diameters of a disk surface and settling time to properly align over a particular track. Rotational latency refers to the latency associated with waiting for a disk to spin so that a desired location of the track is in proximity with the read/write head. There are other latencies of lesser magnitude associated with processing time, switching from read to write, and switching between heads, but these may be of such a magnitude that they can be ignored in some applications.

Essentially, a servo distance between two access commands represents the latency in switching from the end cylinder-head-sector of a first command (taking into account the command type), to the beginning cylinder-head-sector of a second command. Various algorithms may be used to compute the servo distance from the data stored in command queue. Essentially, the algorithms will compute an absolute difference between the cylinder, head and sector information and apply different weights to the absolute values, and arithmetically combine the weighted values. The weights will be selected to meet the needs of a particular application and may be matched to performance characteristics of a particular drive.

The chosen algorithm(s) is(are) implemented in computational logic 106 which stores the computed value in the "SERVO DISTANCE" field of hardware command queue 102. In an example operation, the SERVO DISTANCE value that is stored in any given entry 107 is the servo distance between the end location of the currently designated head entry and the beginning location of the given entry 107. Rather than a comparison with the head entry, a fixed location may be used and the various entries 107 compared by their relative distance to this fixed location.

It is contemplated that other factors may be considered in particular systems, including a mechanism for explicitly prioritizing the various commands so that some commands will be expedited over others even though overall system performance is compromised. Other algorithms may prioritize read operations over write operations. Any type of data about the command to be executed may be stored in hardware command queue 102 to support such modifications.

As shown in FIG. 2, a double link list is implemented in hardware command queue 102 by the combination of the "NEXT COMMAND POINTER" and "PREVIOUS COMMAND POINTER" fields. These pointer fields are written by either computational logic 106 or sequencer 103 depending on the allocation of logic in a particular implementation. The NEXT COMMAND POINTER value for a given entry points to another entry 107 that will, under the current sequence, be executed immediately after execution of the given entry. Similarly, the PREVIOUS COMMAND POINTER value for a given entry points to another entry 107 that will, under the current sequence, be executed immediately prior to execution of the given entry. The pointer values are updated continuously as new commands are queued and completed commands are removed from the queue. Sequencer 103 can read the pointer values to select entries 107 for comparison by computational logic 106 during the update processes, and to set flags indicating which entry 107 is to be launched to, or fetched by, command processor 104.

A set of control flags is associated with each entry 107. In an exemplary implementation, these flags include a valid flag that indicates that the entry 107 is valid or empty. A head flag indicates that the entry 107 is the head of the queue (i.e., holds the active disk command). A tail entry indicates that the entry 107 is the tail or last command of the current command sequence of the queue. A next command flag indicates that the entry 107 is the next command after the Head entry to be sent to command processor 104. A block flag indicates that reordering is not desirable for this entry 107, which may be used by sequencer 103 to block the re-ordering of all the existing or prior entered commands. A write/read flag indicates a disk command write/read access. If the disk feed command is in a sequence of commands, it may imply a block condition based on the reordering algorithm. An invalid distance flag indicates that the Servo Distance in the entry 107 is invalid (e.g., due to the insertion of the new entry).

Figure 3:
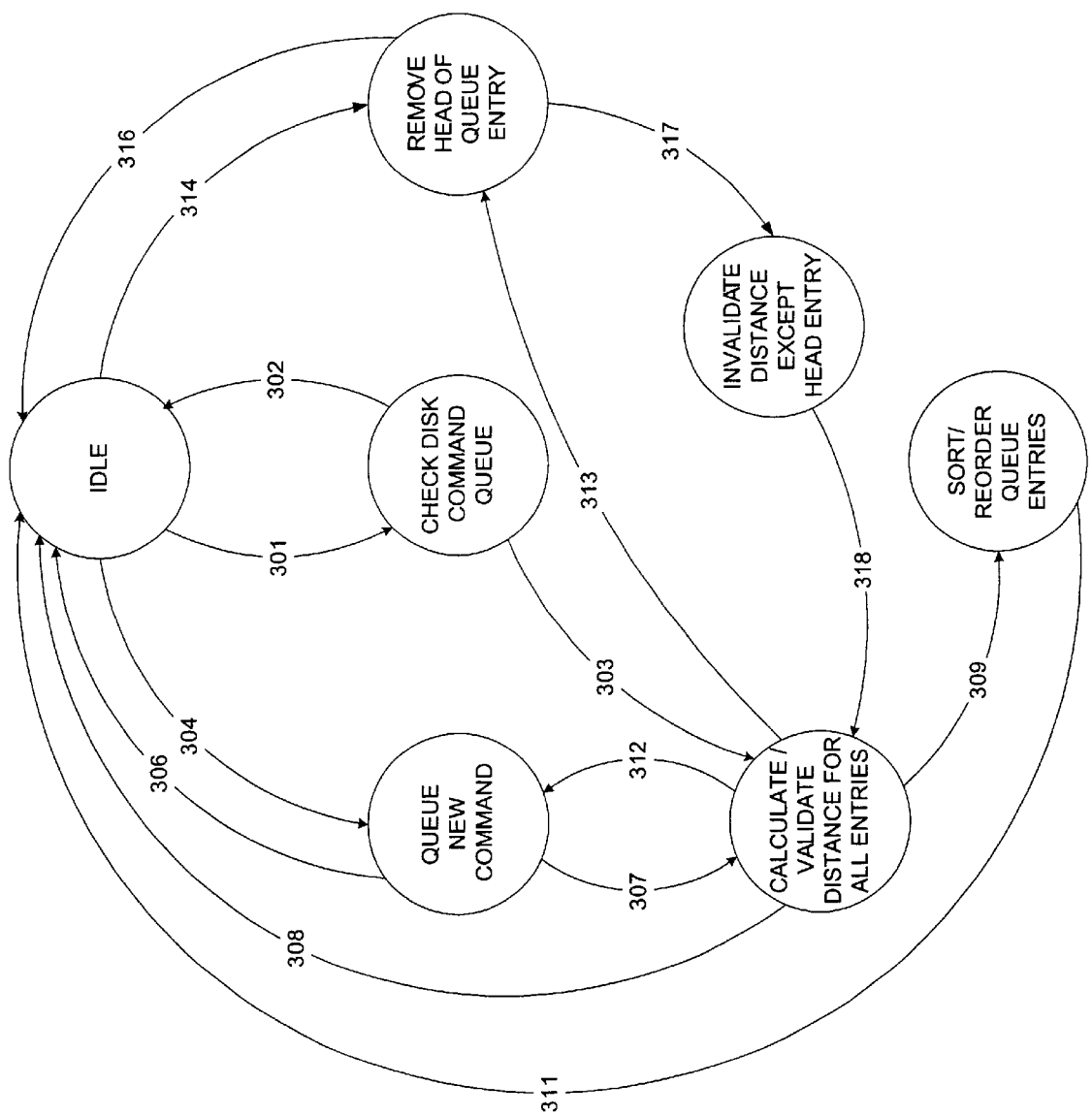
FIG. 3 is a state transition diagram implemented in an exemplary embodiment of the present invention.

FIG. 3 is a state transition diagram implemented in an exemplary embodiment of the present invention. FIG. 3 shows seven control states used in a particular implementation, including an IDLE state, a CHECK DISK COMMAND QUEUE state, a QUEUE NEW COMMAND state, a CALCULATE/VALIDATE DISTANCE FOR ALL ENTRIES state, a SORT/REORDER QUEUE ENTRIES state, an INVALIDATE DISTANCE EXCEPT HEAD ENTRY and a REMOVE HEAD OF QUEUE ENTRY state. These states each correspond to a series of behaviors implemented by the hardware command queue through the cooperation of sequencer 103, computational logic 106, and the command queue 102 itself.

From the IDLE state, the system periodically performs a transition 301 to the CHECK DISK COMMAND QUEUE state. In this state, entries 107 are checked to determine if any entries have an invalid servo distance value. When all entries are valid, a transition 302 returns the system to the IDLE state. When an entry 107 is found to be invalid, control passes through transition 303 to the CALCULATE/VALIDATE DISTANCE FOR ALL ENTRIES state. In this state, the servo distance computation is performed for all entries by selecting each entry 107 and performing the servo distance computation, then storing the new servo distance value.

Returning to the IDLE state, when a new command is received, transition 304 is taken to the QUEUE NEW COMMAND state in which the new command is assigned to an empty entry 107 in the command queue 102. In the case where there is only one command in queue 102, transition 306 is taken back to the IDLE state. When more than one command is in queue 102, transition 307 is taken to the CALCULATE/VALIDATE DISTANCE FOR ALL ENTRIES state.

From the CALCULATE/VALIDATE DISTANCE FOR ALL ENTRIES state, which can be entered from a number of other states, transition 308 is taken back to the IDLE state when the command queue 102 contains less than two entries. In this case, there is no need to reorder the queue 102. However, when there are more than two entries, transition 309 brings the system to the SORT/REORDER QUEUE ENTRIES state where the pointer values are updated for each entry 107. Transition 311 brings the newly reordered system back to the IDLE state.

From the CALCULATE/VALIDATE DISTANCE FOR ALL ENTRIES state, transition 312 is taken when the CALCULATE/VALIDATE DISTANCE FOR ALL ENTRIES state was entered via the QUEUE NEW COMMAND state. In the case of a QUEUE NEW command, the current calculations are interrupted to enter the new command in the Queue.

Executed disk commands are removed from queue 102 by a transition 314 from the IDLE state to the REMOVE HEAD OF QUEUE ENTRY state. When, after the command is removed there remain one or zero commands in queue 102, transition 316 is taken back to the IDLE state as no reordering is required. However, when two or more commands remain in queue 102, transition 317 is taken to the INVALIDATE DISTANCE EXCEPT HEAD ENTRY state. In this state, distance valid flags for all entries 107 are invalidated, although the servo distance for the new head entry does not need to be invalidated. Transition 318 is then taken to the CALCULATE/VALIDATE DISTANCE FOR ALL ENTRIES state in which the servo distance values for each entry 107 are re-computed and stored in queue 102. Transition 313 is taken when the CALCULATE/VALIDATE DISTANCE FOR ALL ENTRIES state was entered via the REMOVE HEAD OF QUEUE state, indicating that a command has been completed and is being removed from the queue and all entries will be invalidated.

Figure 4:
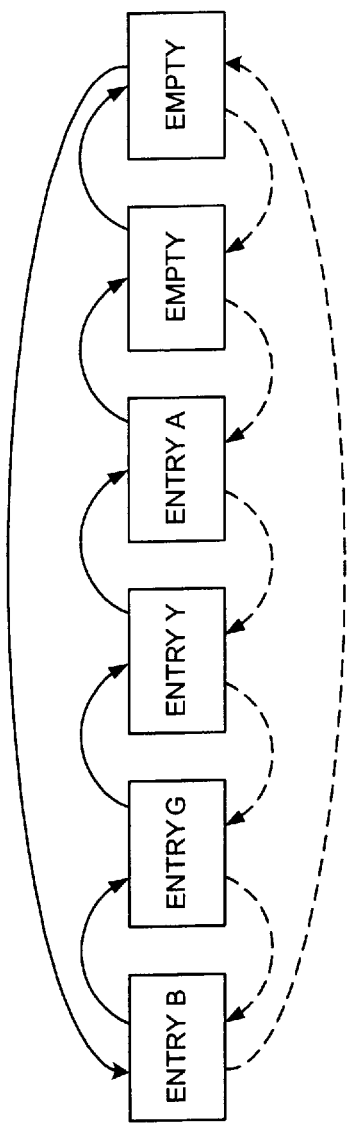
FIG. 4 through FIG. 7 illustrate command sequencing operations in accordance with the present invention.

An example of the disk command queuing and re-ordering is shown in the queuing data structure diagrams of FIG. 4 through FIG. 7. FIG. 4 shows an ordered disk command queue including six entries 107. In FIG. 4, two entries 107 are empty. The entry 107 labeled "Entry B" is the Head entry, and has a next command pointer pointing to Entry G and a previous command pointer pointing to the right-most empty entry 107. Similarly, Entry G points to Entry Y, which points to Entry A. The dashed line arrows in FIG. 4–FIG. 7 refer to the previous command pointer values. The command sequence specified by the pointers in FIG. 4 will execute the instructions in the order: B, G, Y, A. It is important to understand that although the entries shown in FIG. 4 are ordered left to right in order of the execution sequence for ease of illustration, physical ordering of entries 107 is independent of the logical ordering created by the pointers.

Figure 5:
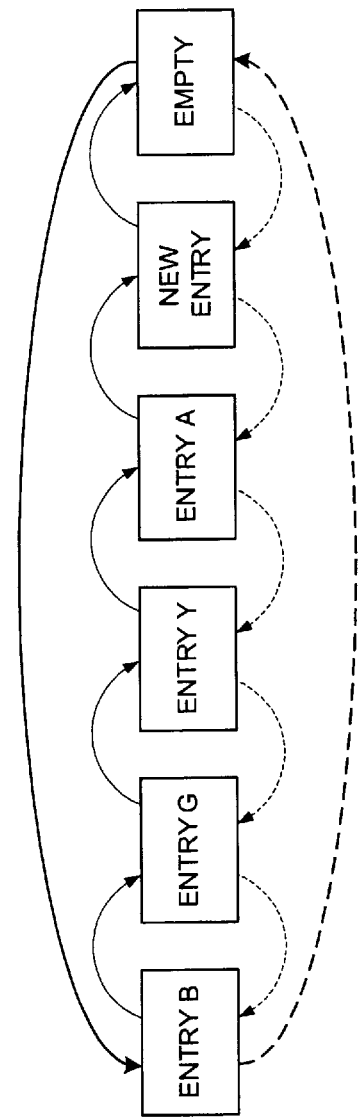

As shown in FIG. 5, upon receiving a New Entry, the new command is entered into an entry 107 with the Valid and Invalid Distance bits set in the flag fields. When the re-ordering function is not enabled, the commands in queue 102 will be executed in the first in first out order. With the re-ordering function enabled, the servo distance is calculated between the New Entry and Entry B (e.g., the current head entry). The computed value is compared against the servo distance value stored in Entry G. When Entry G is closer to the Entry B as compared to the New Entry, Entry G remains as the 2nd (i.e., next-in-line) command.

Figure 6:
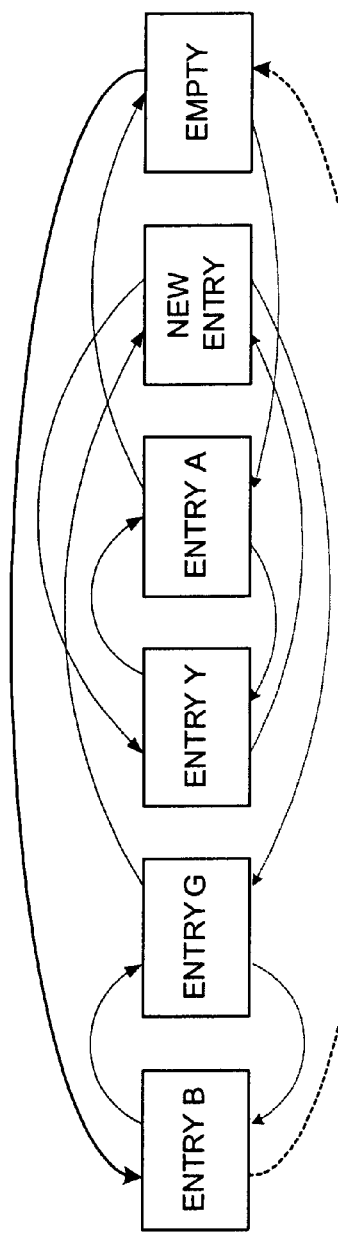

A new servo distance value will then be calculated between the Entry G and the New Entry. The disk command sequencer 103 will repeat the above steps until finding the servo distance of the new entry closer than one in an existing entry 107, or reaching the end of the queue (e.g., an empty queue entry). The example in FIG. 6 shows that the new entry is queued as 3rd command after entry G and before entry Y. The servo distance is validated and stored in the command entry 107. After inserting the New Entry command, the invalid distance bits in both entry Y and entry A are invalidated. Also, Entry A and the empty queue entry are linked by changes to the pointer values in the corresponding entries 107.

Figure 7:
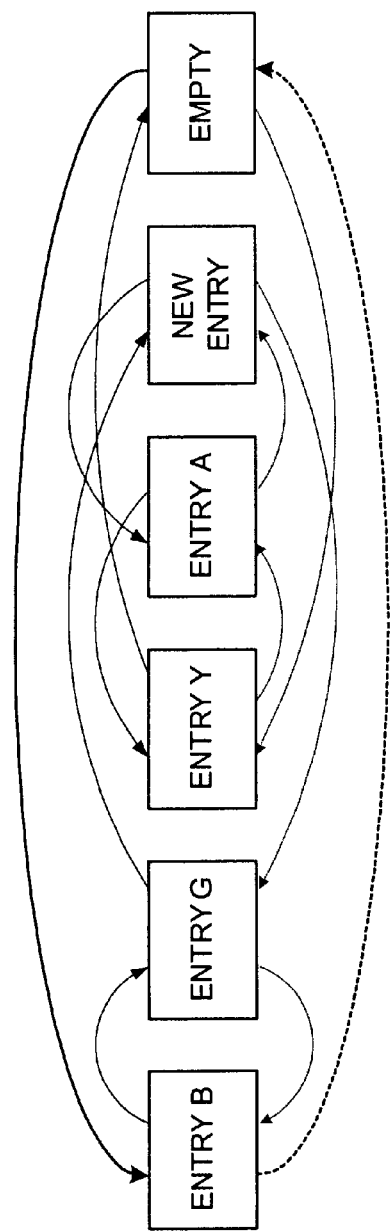

Insertion of the new entry may or may not affect the execution order of subsequent commands. The servo distance between entry Y and the new entry are compared against the servo distance from the Entry A and new entry. When entry Y's servo distance is closer, the ordering process is complete because there is no change in execution sequence. The example of FIG. 7 shows that Entry A is closer to the new entry. The reordering is implemented by appropriate changes to the pointer values in entries 107.

To lessen complexity of the computation of the servo distance, a single point comparison can be used as an alternative re-ordering method. All entries in the queue have servo distance calculated against the current head entry. Upon receiving a new command, the new entry servo distance is calculated. Then by comparing against the rest of queue entries 107, the new entry is re-ordered based on the servo distance. There is no further re-ordering after the insertion of the new entry.

Once the head entry is executed and removed from the queue, all servo distance values in the entries 107 are re-calculated against the next-in-line command. In the example of FIG. 4–FIG. 7, Entry G is used as the reference. When Entry G is executed and designated as the head entry, the hardware sequencer 103 calculates the servo distance for the rest of the entries 107 in disk command queue 102. The next-in-line command (e.g., entry Y in FIG. 4 or the new entry in FIGS. 6–7) will be determined and ordered in queue once the computation is completed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A hardware command queue for mass storage systems comprising:
    a memory device;
    a plurality of entries defined in the memory device, at least some of which are active entries, wherein at least some of the active entries correspond to pending access commands and at least one entry is a head entry corresponding to an in-flight access command;
    a physical target location stored in each active entry;
    a computed servo distance value stored in each active entry indicating a servo distance between the in-flight access command and the pending access command corresponding to the entry, wherein the servo distance stored in a particular active entry represents a latency in switching from a physical target location of a first command to a physical target location of the access command corresponding to the particular active entry; and
    a link list comprising pointers defining an execution sequence, wherein an entry having the smallest servo distance value is marked as a next request to be launched by a command processor.

2. The hardware command queue of claim 1 wherein the link list comprises a next command pointer stored in each entry.

3. The hardware command queue of claim 1 wherein the link list comprises a previous command pointer stored in each entry.

4. The hardware command queue of claim 1 further comprising a valid flag stored in each entry indicating whether the entry is active or empty.

5. The hardware command queue of claim 1 further comprising a head flag indicating that the entry is the head entry.

6. The hardware command queue of claim 1 further comprising a tail flag indicating that the entry is a last active entry in the queue.

7. The hardware command queue of claim 1 further comprising a next to launch flag indicating that the entry is the next entry after the head entry to be serviced.

8. The hardware command queue of claim 1 further comprising a flag indicating associated with each entry indicating that the associated entry is not to be reordered during a redefinition of the execution sequence.

9. The hardware command queue of claim 1 further comprising a flag associated with each entry indicating that the servo distance value of the associated entry is invalid.

10. The hardware command queue of claim 1 further comprising:
    a selection interface for selecting one or more entries;
    a comparison interface for presenting the selected one or more entries to external computational logic; and
    a port for receiving servo distance data from the external computational logic on an entry-by-entry basis; and
    a port for communicating link list pointers with external sequencing logic.

11. A disk drive comprising:
    a randomly accessible storage media;
    a head including devices operable to communicate data with the storage media;
    an actuator coupled to position the head with respect to the storage media in response to positioning signals;

a controller coupled to receive access request commands and coupled to the head and actuator to service access request commands;

a hardware command queue coupled to the controller and having a plurality of entries configured to queue access commands prior to their being serviced;

computational logic coupled to the command queue to determine a servo distance value for each entry, wherein the servo distance represents a latency in switching from a physical location of a first command to a physical location of a second access command; and a sequencer coupled to the command queue and responsive to the servo distance value to determine an execution sequence for the queued commands and store the determined sequence in the hardware command queue, wherein an entry having the smallest servo distance value is marked as a next request to be launched by the controller.

12. The disk drive of claim 11 wherein the command queue further comprises:

a memory device coupled to the controller, wherein the a plurality of entries are defined in the memory device;

a field in each active entry for storing a physical target location;

a field in each active entry for storing the computed servo distance value; and a link list comprising pointers defining the execution sequence stored.

13. The hardware command queue of claim 12 wherein the link list comprises a next command pointer stored in each entry.

14. The hardware command queue of claim 12 wherein the link list comprises a previous command pointer stored in each entry.

15. A method for accessing a mass storage device comprising:

storing a plurality of mass storage access requests in a hardware command queue, wherein each mass storage access request is stored within an entry in the queue;

designating an entry holding a currently active access request as a head entry;

storing a servo distance value in the hardware command queue with the access request wherein the servo distance value indicates a servo distance between the in-flight access command and the pending access command corresponding to the entry, wherein the servo distance stored in a particular active entry represents a latency in switching from a physical target location of a first command to a physical target location of the access command corresponding to the particular active entry;

storing a link list in the hardware command queue specifying an execution sequence for the commands stored in the hardware command queue; and marking the entry having the smallest servo distance value as a next request to be launched.

16. The method of claim 15 wherein the servo distance value indicates a distance between each entry and the head entry.

17. The method of claim 15 further comprising:

receiving a new mass storage access request;

storing the new mass storage access request along with the previously-stored access requests in the hardware command queue;

computing a servo distance for the new mass storage access request; and updating the link list to indicate an execution sequence that includes the new mass storage access request.

18. The method of claim 17 wherein the step of updating the link list comprises:

determining a first pointer value indicating a request that will follow the new command in the execution sequence; and determining a second pointer value indicating a command that will precede the new access request in the execution sequence.

19. The method of claim 15 further comprising:

using the link list, designating one of the stored access requests as a next to be executed access request;

upon completion of the currently active access request, invalidating the head entry;

using the link list, designating an entry storing the next to be executed access request as a new head entry; and causing storage access command execution resources to fetch the command stored in the new head entry.

20. The method of claim 19 further comprising:

re-computing the servo distance for each entry based upon the new head entry; and updating the link list based upon the re-computed servo distances.

* * * * *